United States Patent
Mayhew et al.

(10) Patent No.: US 7,006,338 B2
(45) Date of Patent: Feb. 28, 2006

(54) SYSTEM AND METHOD FOR INDIVIDUAL PHASE MOTOR OVER VOLTAGE PROTECTION

(75) Inventors: Scott Mayhew, North Aurora, IL (US); Daniel Zuzuly, Geneva, IL (US); Scott Wakefield, Plano, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 167 days.

(21) Appl. No.: 10/252,635

(22) Filed: Sep. 23, 2002

(65) Prior Publication Data

US 2004/0057171 A1    Mar. 25, 2004

(51) Int. Cl.
    *H02H 7/06* (2006.01)
(52) U.S. Cl. ............................. 361/23; 361/20; 361/33
(58) Field of Classification Search ................. 361/19, 361/20, 21, 23, 160, 166, 191, 33; 318/727, 318/729, 459, 440, 434
    See application file for complete search history.

(56) References Cited

U.S. PATENT DOCUMENTS

| 4,404,511 | A | * | 9/1983 | Nola ........................... 318/729 |
|---|---|---|---|---|
| 4,598,354 | A | | 7/1986 | Kindler et al. ............... 364/174 |
| 4,634,951 | A | * | 1/1987 | Kampf et al. ................ 318/778 |
| 4,636,702 | A | * | 1/1987 | Hedges ........................ 318/729 |
| 4,775,924 | A | * | 10/1988 | Sweezy ........................ 363/51 |
| 4,931,715 | A | * | 6/1990 | Lee et al. .................... 318/709 |
| 5,341,080 | A | * | 8/1994 | Agut Sanz ................... 318/778 |
| 5,488,281 | A | | 1/1996 | Unsworth et al. .......... 318/806 |
| 5,684,377 | A | * | 11/1997 | Kim et al. ................... 318/799 |
| 6,201,369 | B1 | | 3/2001 | Johnson ....................... 318/811 |
| 2004/0169968 | A1 | * | 9/2004 | Mohr et al. .................. 361/33 |

FOREIGN PATENT DOCUMENTS

DE            4413802 A1    11/1995

OTHER PUBLICATIONS

PCT, International Search Report mailed Mar. 15, 2004.

* cited by examiner

*Primary Examiner*—Brian Sircus
*Assistant Examiner*—Danny Nguyen

(57) ABSTRACT

A motor controller comprises a plurality of solid state switches each for connection between an AC line and a motor winding terminal for controlling application of AC power to the motor. A plurality of voltage sensors, each associated with one of the solid state switches, sense voltage for an associated motor winding. A control circuit controls operation of the solid state switches. The control circuit adjusts firing to one of the solid state switches if the sensed voltage for the associated winding varies from a threshold voltage by a select amount.

15 Claims, 5 Drawing Sheets

SYSTEM AND METHOD FOR INDIVIDUAL PHASE MOTOR OVER VOLTAGE PROTECTION

CROSS REFERENCE TO RELATED PATENT APPLICATIONS

U.S. patent application Ser. No. 10/252,618 entitled "System and Method for Monitoring Currents and for Providing Motor Protection", (2002P14783US), and U.S. patent application Ser. No. 10/252,326 entitled "System and Method for Configuring a Starter with an External Device", (2002P14801US), and U.S. patent application Ser. No. 10/252,637 entitled "System and Method for Automatic Current Limit Control", (2002P14789US), and U.S. patent application Ser. No. 10/252,327 entitled "System and Method for a Configurable Motor Controller", (2002P14792US), are filed with the U.S. Patent and Trademark Office concurrently on Sep. 23, 2002, the entirety of each being incorporated herein by reference.

FIELD OF THE INVENTION

This invention relates to a motor controller and more particularly, a system and method for individual phase motor over voltage protection.

BACKGROUND OF THE INVENTION

Solid state starters/controllers have found widespread use for controlling application of power to an AC induction motor. The conventional starter/controller, referred to hereinafter as simply a starter or a controller, uses solid state switches for controlling application of AC line voltage to the motor. The switches may be thyristors such as silicon controlled rectifiers (SCRs) or triacs.

One known motor controller in the form of an elevator starter provides motor protection in the form of an overload and current imbalance fault. The current imbalance fault is logged as a single phase fault. Experience has forced the ratio of lowest current to the highest current to be reduced to 30% for a fault to occur. One of the conditions that forces the ratio to the low level is voltage imbalances on systems where one or two of the incoming phases are heavily loaded. In these circumstances the power company attempts to maintain the loaded phases at the nominal value. This can cause excessive voltages in the unloaded phases. If the motor is running, then these excessive voltages will cause high currents in the lightly loaded phase or phases. Under conditions where the load on the motor is light, causing the motor currents to be less than the overload settings, then the imbalance is completely ignored by the starter. Under conditions where the voltage is high enough on one or two of the incoming phases, then the currents can be high enough to exceed the overload setting and cause damage to the motor. Depending on the magnitude of the voltage, the iron associated with that motor winding can saturate which leads to very high currents. Allowing the starter to run under these conditions can cause excessive heating in the windings and reduce the lifetime of the motor. However, shutting the motor controller down under these conditions can cause the elevator to stop and result in service calls.

Other motor controllers monitor line voltage and limit the voltage on all three phases during high voltage conditions. On a system that works off all three voltages under situations where one voltage is extremely high the firing angle to the SCRs for all three phases is reduced. While the voltage to the motor would be decreased on the phase with the excessive voltage, the voltage would also be reduced on the other phase or phases. This may result in unbalanced currents and could cause the motor to go into a stall condition.

The present invention is directed to solving one or more of the problems discussed above, in a novel and simple manner.

SUMMARY OF THE INVENTION

In accordance with the invention there is provided a system and method for individual phase motor over voltage protection.

Broadly, there is disclosed in accordance with one aspect of the invention a motor controller comprising a plurality of solid state switches each for connection between an AC line and a motor winding terminal for controlling application of AC power to the motor. A plurality of voltage sensors, each associated with one of the solid state switches, sense voltage for an associated motor winding. A control circuit controls operation of the solid state switches. The control circuit adjusts firing to one of the solid state switches if the sensed voltage for the associated winding varies from a threshold voltage by a select amount.

It is a feature of the invention that the control circuit continues to adjust firing to the one of the solid state switches if the sensed voltage for the associated winding continues to vary from the threshold voltage by the select amount.

It is another feature of the invention that the control circuit gradually returns firing to the one of the solid state switches to a full on condition if the sensed voltage for the associated winding does not vary from the threshold voltage by the select amount.

It is still another feature of the invention that the select amount is selected to be a select value above the nominal motor voltage.

It is a further feature of the invention that the control circuit adjusts firing to the one of the solid state switches if the sensed voltage for the associated winding exceeds nominal motor voltage by about 20%.

There is disclosed in accordance with another aspect of the invention a motor controller with individual phase over voltage protection comprising a plurality of solid state switches. Each switch is for connection in series with an associated motor winding between an AC line phase and an associated motor winding terminal for controlling application of AC power to the motor. A plurality of voltage sensors, each associated with one of the solid state switches, sense line voltage and motor terminal voltage. A control circuit is connected to the solid state switches and the voltage sensors for controlling operation of the solid state switches. The control circuit determines voltage across each motor winding responsive to sensed line and motor terminal voltages and adjusts firing to individual ones of the solid state switches if the sensed voltage for the associated winding varies from a threshold voltage by a select amount.

According to one aspect of the invention, the motor controller comprises an elevator starter to power an elevator drive motor.

There is disclosed in accordance with a further aspect of the invention a motor controller with individual phase over voltage protection comprising a plurality of solid state switch means, each for connection in series with an associated motor winding between an AC line phase and an associated motor winding terminal for controlling application of AC power to the motor. Voltage sensing means sense line voltage and motor terminal voltage. Control circuit means are connected to the solid state switch and the voltage sensing means for controlling operation of the solid state switch means, comprising determining means for determining voltage across each motor winding responsive to the sensed line and motor terminal voltages and means for adjusting firing to individual ones of the solid state switch means if the sensed voltage for the associated winding varies from a threshold voltage by a select amount.

There is disclosed in accordance with a further aspect of the invention a method for individual phase motor protection comprising: providing solid state switches for connection between an AC line and motor terminals for controlling application of AC power to the motor; sensing line voltage and motor terminal voltage; and controlling operation of the solid state switches, comprising determining voltage across each motor winding responsive to the sensed line and motor terminal voltages and adjusting firing to individual ones of the solid state switches if the sensed voltage for the associated winding varies from a threshold voltage by a select amount.

Further features and advantages of the invention will be readily apparent from the specification and from the drawings.

DETAILED DESCRIPTION OF THE INVENTION

Figure 1:
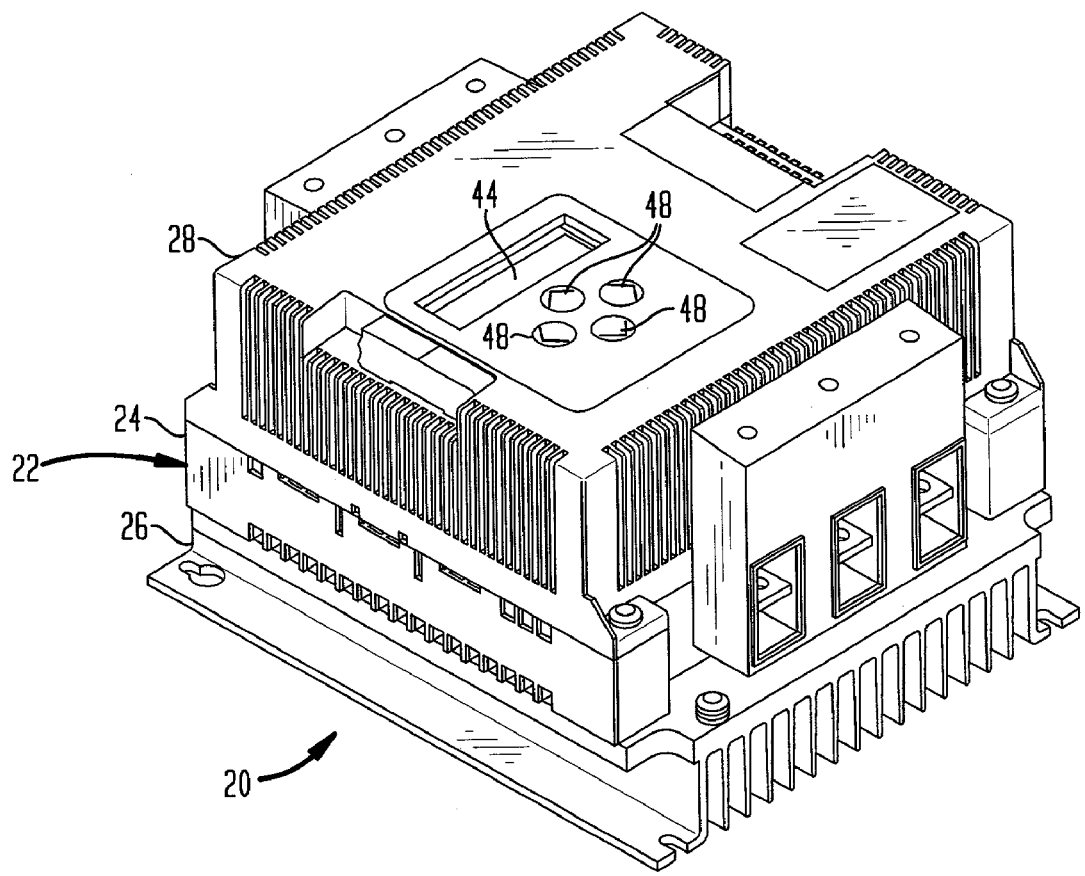
FIG. 1 is a perspective view of a motor controller in accordance with the invention.

Referring initially to FIG. 1, a solid state motor starter/controller 20, referred to hereinafter as simply a starter or a controller, is illustrated. One application for the controller 20 is as an elevator starter. The motor controller 20 may be used to drive a pump for an hydraulic elevator. Each time movement of an elevator car is commanded, then the motor controller 20 must start the elevator motor until it reaches operating speed and then operate in a run mode. Such a motor controller 20 may only be used for the up direction as gravity may be used for the down direction.

The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art.

Figure 2:
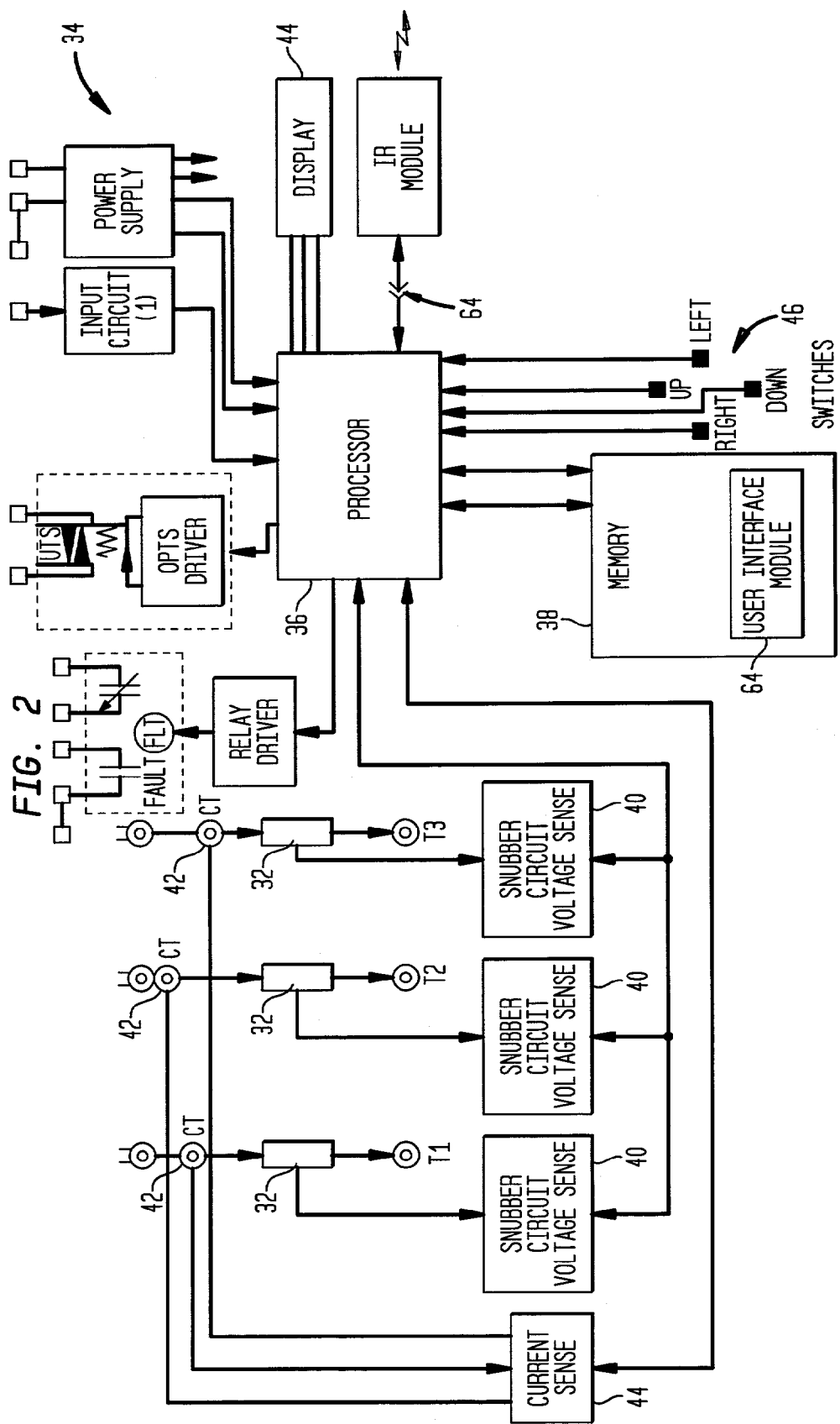
FIG. 2 is a block diagram of the motor controller of FIG. 1.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores programs and configuration information relating to operation of the SCRs 32, as described below.

The processor 36 is connected to three interface circuits 40 each for connection to one of the SCRs 32. Particularly, the interface circuits 40 comprise snubber circuits for driving the SCRs 32 and voltage sense circuits for sensing line voltage and motor terminal voltage, representing voltage across the SCRs 32. A current transformer 42 senses current of each of the SCRs 32 and is connected to a current sense circuit 44. Other types of current sensors could be used. The current sense circuit 44 is also connected to the processor 36.

An LCD display 44 on the cover 22, see FIG. 1, is connected to the processor 36. The display 44 is used to indicate configuration settings, operating values, fault conditions, and the like. User actuable switches 46 are electrically connected to the processor 36. The user actuable switches 46 are actuated by actuator elements 48 on the housing cover 22, see FIG. 1. Particularly, the switches 46 are used for locally selecting parameters for stored configuration information.

Figure 3:
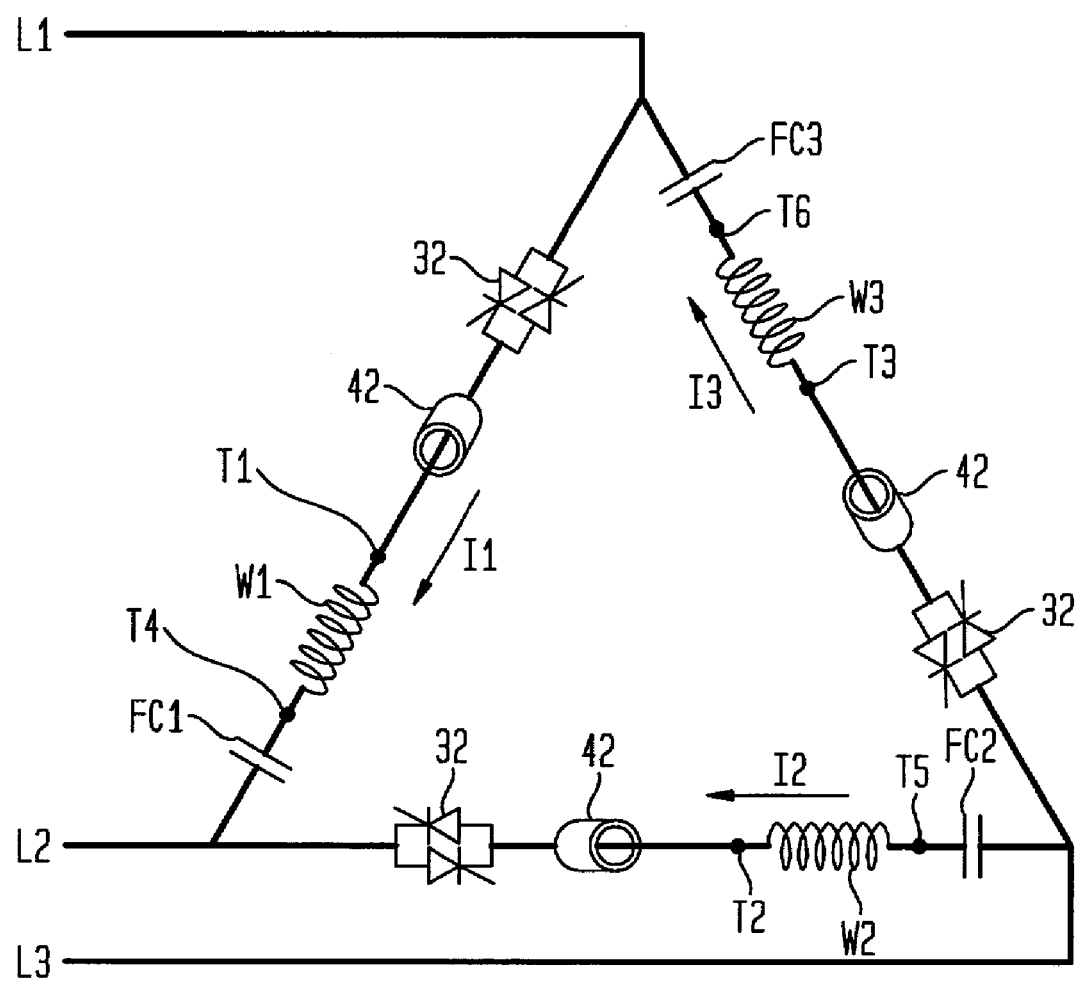
FIG. 3 is a wiring diagram of the motor controller of FIG. 1 connected to a motor in a delta configuration.

Referring to FIG. 3, an electrical schematic illustrates connection of the SCRs 32 of FIG. 2 to motor windings W1, W2 and W3 in a delta configuration. As noted above the winding W1–W3 may be windings for an elevator motor. For example, one of the SCRs 32 is connected between the first phase line voltage L1 and the first motor winding terminal T1. The first motor winding W1 is connected in series with the SCR 32 between the motor terminal T1 and another motor terminal T4. The current transformers 42 sense current through the winding W1. A fault contact FC1 is also connected in series. The other legs of the delta configuration are generally similar and are conventional in nature. As is apparent, other motor configurations could be used in connection with the disclosed system and method.

Figure 4:
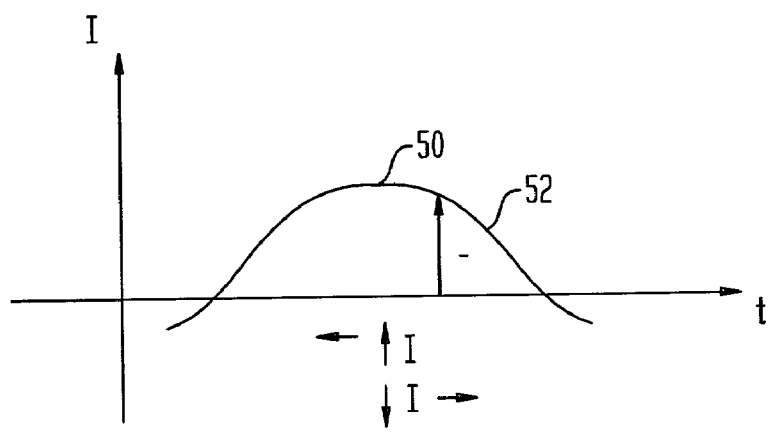
FIG. 4 is a curve illustrating control for the SCRs of the motor controller.

The processor 36 of FIG. 2 operates in accordance with a control program for controlling operation of the SCRs 32. Particularly, each SCR 32 is conventionally controlled to satisfy voltage and current requirements. This is done by altering the firing angle of the SCRs 32. FIG. 4 shows a graphical illustration including a line curve 50 representing input current. A vertical arrow 52 represents firing angle of the SCRs 32. As is conventional, the firing angle 52 is controlled by the processor 36 to satisfy operating requirements. To lower current the firing angle 52 would be moved to the right in FIG. 4 to decrease conduction time. Conversely, to increase current the firing angle 52 would be moved to the left to increase conduction time, as is well known. During start mode, the processor 36 ramps the current up by gradually advancing the firing angle 52 in a time specified to satisfy preselect acceleration time and acceleration torque values up to a select starting current limit setting value. By adjusting the delay in firing the SCRs 32, the processor 36 can maintain this level. As the motor speed increases, the current begins to decrease. The processor 36 continually increases the voltage to offset the reduction in current. This maintains a constant current at the setting of the starting current limit switch provided that the voltage to the motor can be increased at a rate greater than the decrease in the motor slip resistance as the motor comes up to speed. Subsequently during a run mode the control circuit 34 applies full voltage to the motor.

In accordance with the invention, the control circuit 34 utilizes an over voltage protection module 54, see FIG. 2, to monitor actual RMS voltage across each winding W1–W3 and adjust the voltage on each phase independent of the other phases to protect the windings separately.

As noted above, the voltage sensing circuits 40 monitor the three line voltages L1, L2 and L3, see FIG. 3, and the three motor terminal voltages T1, T2, and T3. Therefore, the motor controller 20 can incorporate an individual phase motor over voltage protection mode which limits the voltage in only the phase or phases with the excessive line voltage. The voltages will be based upon the nominal motor voltages of 200, 230, 400, 460, or 575 VAC. If the voltage across one or more of the motor windings W1–W3 exceeds the nominal voltage by, for example, 20%, then the starter phases back the firing angle of the phase with the excessive voltage to limit each individual motor windings voltage to the nominal motor voltage plus 20%. With this method, the windings across the phases with the lower voltage receive the full voltage while the winding or windings with the higher voltages receive partial voltage. This results in current imbalances being minimized and the motor being prevented from stalling out. Particularly, the load, such as an elevator, can continue to run without any long term damage to the motor under high voltage conditions. By monitoring the actual motor winding voltage the starter can eliminate damage due to over voltage and individually adjust the voltage to each winding allow the motor to continue to run.

Figure 5A:
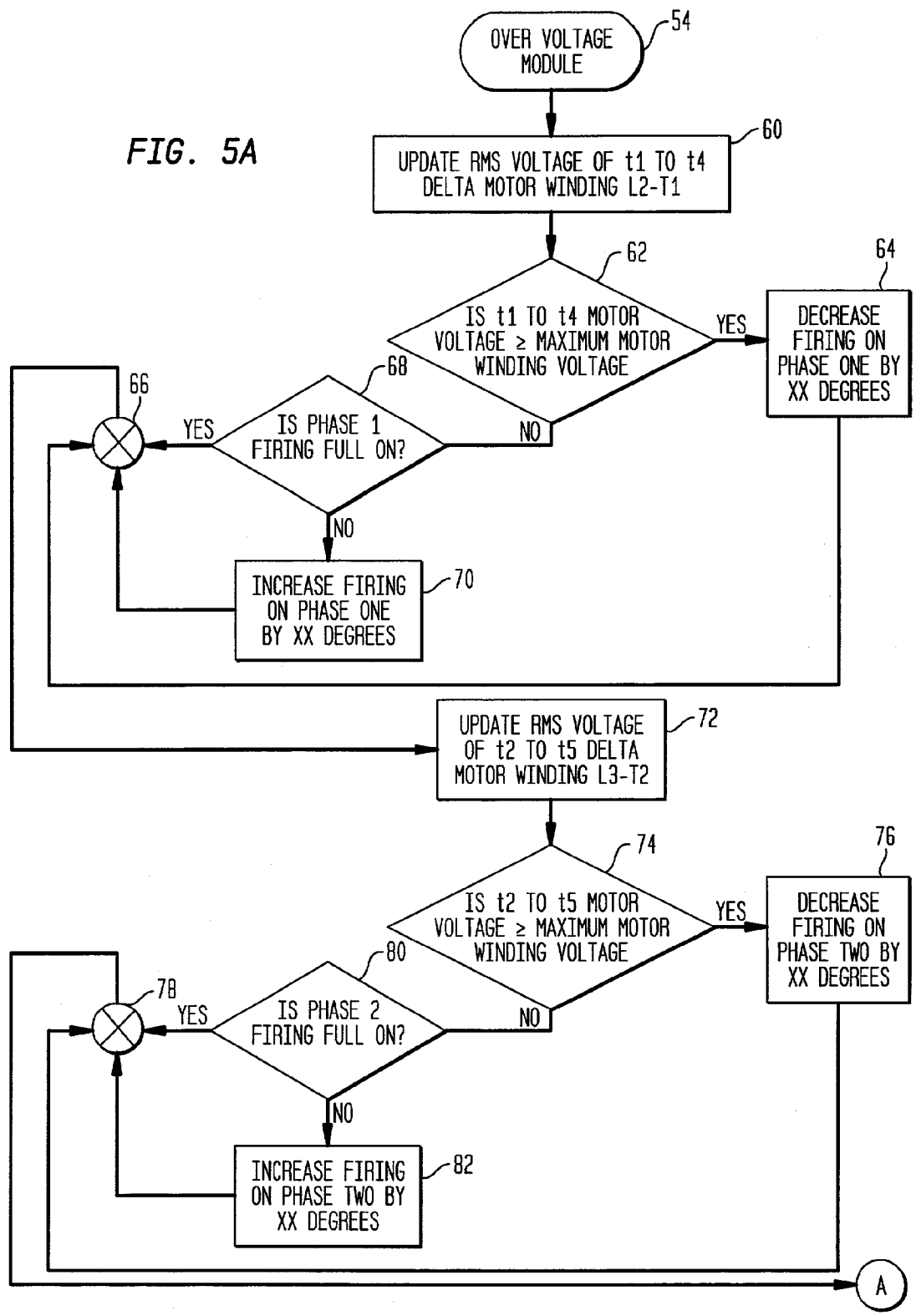
FIGS. 5A and 5B are a flow diagram illustrating a motor over voltage module implemented by a processor of FIG. 2.
Figure 5B:
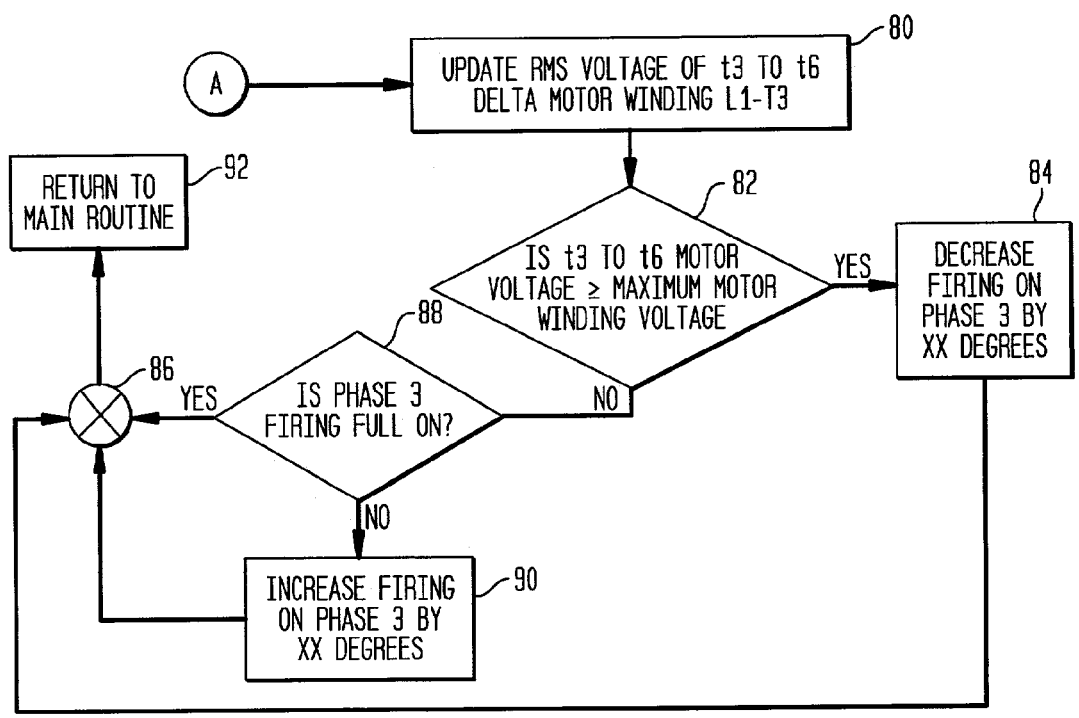

Referring to FIGS. 5A and 5B a flow diagram for the software of the over voltage module 54 is illustrated. This module is generally used during the run mode when the control circuit 34 applies full voltage to the motor windings W1–W3. The routine begins at a block 60 to update the RMS voltage of the first winding W1 between the terminals T1 and T4. This is determined using the sensed voltages for the second line L2 and the first terminal T1, see FIG. 3. A decision block 62 determines if the voltage across the first winding W1 is greater than equal to a maximum motor winding voltage. This is determined by comparing the updated voltage to a threshold amount which may be, for example, about 20% above nominal voltage, as described above. As is apparent other threshold amounts could also be used. If so, the a block 64 decreases the firing angle on phase 1 by XX degrees, where XX is a preselect amount. Control then proceeds to a junction 66. If the motor winding voltage is not greater than the maximum motor winding voltage, as determined at the decision block 62, then a decision block 68 determines if the first phase is firing full on. If so, then control proceeds to the junction 66. If not, then a block 70 increases the firing angle on the first phase by XX degrees. From there, control proceeds to the junction 66.

From the junction 66, control proceeds to a block 72 which updates the voltage across the second winding W2 as a function of the sensed voltage for the motor terminal T2 and the line voltage L3. A decision block 74 determines if the motor winding voltage is greater than the maximum motor winding voltage. If so, then a block 76 decreases the firing angle on the second phase by XX degrees. Control then advances to a junction 78. If not, then a decision block 80 determines if the phase two is firing full on. If so, then control proceeds to the junction 78. If not, then a block 82 increases the firing on phase two by XX degrees.

From the junction 78, control proceeds via a node A to FIG. 5B and a block 80 which updates the RMS voltage of the third winding W3 as a function of the sensed line voltage L1 and motor terminal voltage T3. A decision block 82 determines if the third winding voltage is greater than equal to the maximum motor winding voltage. If so, then a block 84 decreases the firing angle on the third phase by XX degrees and control advances to a junction 86. If not, then a decision block 88 determines if the third phase is firing full on. If so, then control proceeds to the junction 86. If not, then a block 90 increases firing angle on the third phase by XX degrees. Control then advanced to the junction 86. From the junction 86 the control returns to the main routine at a block 92.

As is apparent, the flow diagram of FIGS. 5A and 5B include a similar routine performed with respect to each of the three windings W1–W3. This routine monitors actual RMS voltage across each winding W1–W3 and adjusts the voltage on each phase independent of the other phases to protect the windings separately.

It can therefore be appreciated that a new and novel system and method for individual phase motor over voltage protection in a motor controller has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

We claim:

1. A motor controller comprising:
   a plurality of solid state switches, each for connection between an AC line and a motor winding terminal for controlling application of AC power to the motor;
   a plurality of voltage sensors, each associated with one of the solid state switches, for sensing voltage for an associated motor winding; and
   a control circuit for controlling operation of the solid state switches, the control circuit adjusting firing to one of the solid state switches if the sensed voltage for the associated winding varies from a threshold voltage by a select amount, wherein the control circuit gradually returns firing to the one of the solid state switches to a full on condition if the sensed voltage for the associated winding does not vary from the threshold voltage by the select amount.

2. The motor controller of claim 1 wherein the control circuit continues to adjust firing to the one of the solid state switches if the sensed voltage for the associated winding continues to vary from the threshold voltage by the select amount.

3. A motor controller comprising:
   a plurality of solid state switches, each for connection between an AC line and a motor winding terminal for controlling application of AC power to the motor;
   a plurality of voltage sensors, each associated with one of the solid state switches, for sensing voltage for an associated motor winding; and
   a control circuit for controlling operation of the solid state switches, the control circuit adjusting firing to one of the solid state switches if the sensed voltage for the associated winding varies from a threshold voltage by a select amount, wherein the control circuit returns firing to the one of the solid state switches to a full on condition if the sensed voltage for the associated winding does not vary from the threshold voltage by the select amount.

4. The motor controller of claim 3 wherein the select amount is selected to be a select value above nominal motor voltage.

5. The motor controller of claim 4 wherein the control circuit adjusts firing to the one of the solid state switches if the sensed voltage for the associated winding exceeds nominal motor voltage by about twenty percent.

6. A motor controller with individual phase over voltage protection, comprising:
- a plurality of solid state switches, each for connection in series with an associated motor winding between an AC line phase and an associated motor winding terminal for controlling application of AC power to the motor;
- a plurality of voltage sensors, each associated with one of the solid state switches, for sensing line voltage and motor terminal voltage; and
- a control circuit connected to the solid state switches and the voltage sensors for controlling operation of the solid state switches, the control circuit determining voltage across each motor winding responsive to the sensed line and motor terminal voltages and adjusting firing to individual ones of the solid state switches if the sensed voltage for the associated winding varies from a threshold voltage by a select amount, wherein the control circuit gradually returns firing to the one of the solid state switches to a full on condition if the sensed voltage for the associated winding does not vary from the threshold voltage by the select amount.

7. The motor controller of claim 6 wherein the control circuit continues to adjust firing to the one of the solid state switches if the sensed voltage for the associated winding continues to vary from the threshold voltage by the select amount.

8. The motor controller of claim 6 wherein the solid state switches comprise silicon controlled rectifiers.

9. A motor controller with individual phase over voltage protection, comprising:
- a plurality of solid state switches, each for connection in series with an associated motor winding between an AC line phase and an associated motor winding terminal for controlling application of AC power to the motor;
- a plurality of voltage sensors, each associated with one of the solid state switches, for sensing line voltage and motor terminal voltage; and
- a control circuit connected to the solid state switches and the voltage sensors for controlling operation of the solid state switches, the control circuit determining voltage across each motor winding responsive to the sensed line and motor terminal voltages and adjusting firing to individual ones of the solid state switches if the sensed voltage for the associated winding varies from a threshold voltage by a select amount, wherein the control circuit returns firing to the one of the solid state switches to a full on condition if the sensed voltage for the associated winding does not vary from the threshold voltage by the select amount.

10. The motor controller of claim 9 wherein the select amount is selected to be a select value above nominal motor voltage.

11. The motor controller of claim 10 wherein the control circuit adjusts firing to the one of the solid state switches if the sensed voltage for the associated winding exceeds nominal motor voltage by about twenty percent.

12. A motor controller with individual phase over voltage protection, comprising:
- a plurality of solid state switch means, each for connection in series with an associated motor winding between an AC line phase and an associated motor winding terminal for controlling application of AC power to the motor;
- voltage sensing means for sensing line voltage and motor terminal voltage; and
- control circuit means connected to the solid state switch means and the voltage sensing means for controlling operation of the solid state switch means, comprising determining means for determining voltage across each motor winding responsive to the sensed line and motor terminal voltages and means for adjusting firing to individual ones of the solid state switch means if the sensed voltage for the associated winding varies from a threshold voltage by a select amount, wherein the adjusting means continues to adjust firing to the one of the solid state switch means if the determined voltage for the associated winding continues to vary from the threshold voltage by the select amount and returns firing to the one of the solid state switch means to a full on condition if the sensed voltage for the associated winding does not vary from the threshold voltage by the select amount.

13. A method for individual phase motor protection comprising:
- providing solid state switches for connection between an AC line and motor terminals for controlling application of AC power to the motor;
- sensing line voltage and motor terminal voltage; and
- controlling operation of the solid state switches, comprising determining voltage across each motor winding responsive to the sensed line and motor terminal voltages and adjusting firing to individual ones of the solid state switches if the sensed voltage for the associated winding varies from a threshold voltage by a select amount; and gradually returning firing to the one of the solid state switches to a full on condition if the sensed voltage for the associated winding does not vary from the threshold voltage by the select amount.

14. The method of claim 13 further comprising continuing to adjust firing to the one of the solid state switches if the sensed voltage for the associated winding continues to vary from the threshold voltage by the select amount.

15. The method of claim 13 wherein adjusting firing to individual ones of the solid state switches comprises adjusting firing to the one of the solid state switches if the sensed voltage for the associated winding exceeds nominal motor voltage by about twenty percent.

\* \* \* \* \*